(12) United States Patent
Dice

(10) Patent No.: US 8,407,708 B2
(45) Date of Patent: *Mar. 26, 2013

(54) TECHNIQUES FOR PROVIDING IMPROVED AFFINITY SCHEDULING IN A MULTIPROCESSOR COMPUTER SYSTEM

(75) Inventor: David Dice, Foxborough, MA (US)

(73) Assignee: Oracle America, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/211,762

(22) Filed: Aug. 17, 2011

(65) Prior Publication Data

US 2011/0302585 A1    Dec. 8, 2011

Related U.S. Application Data

(63) Continuation of application No. 11/084,951, filed on Mar. 21, 2005, now Pat. No. 8,051,418.

(51) Int. Cl.
*G06F 9/46* (2006.01)
*G06F 13/00* (2006.01)

(52) U.S. Cl. .................... 718/102; 718/100; 711/147

(58) Field of Classification Search .................. None
See application file for complete search history.

(56) References Cited

U.S. PATENT DOCUMENTS

| | | |
|---|---|---|
| 5,826,079 A | 10/1998 | Boland et al. |
| 5,872,972 A | 2/1999 | Boland et al. |
| 6,105,053 A | 8/2000 | Kimmel et al. |
| 6,269,390 B1 | 7/2001 | Boland |
| 6,633,897 B1 | 10/2003 | Browning et al. |
| 6,728,959 B1 | 4/2004 | Merkey |
| 7,159,216 B2 | 1/2007 | McDonald |
| 7,162,666 B2 | 1/2007 | Bono |
| 7,178,145 B2 | 2/2007 | Bono |
| 2004/0068730 A1 | 4/2004 | Miller et al. |
| 2005/0188068 A1 | 8/2005 | Kilian |
| 2005/0246461 A1 | 11/2005 | Accapadi et al. |
| 2006/0282839 A1 | 12/2006 | Hankins et al. |

*Primary Examiner* — Meng An
*Assistant Examiner* — Tammy Lee
(74) *Attorney, Agent, or Firm* — Brooks Kushman P.C.

(57) ABSTRACT

Techniques for controlling a thread on a computerized system having multiple processors involve accessing state information of a blocked thread, and maintaining the state information of the blocked thread at current values when the state information indicates that less than a predetermined amount of time has elapsed since the blocked thread ran on the computerized system. Such techniques further involve setting the state information of the blocked thread to identify affinity for a particular processor of the multiple processors when the state information indicates that at least the predetermined amount of time has elapsed since the blocked thread ran on the computerized system. Such operation enables the system to place a cold blocked thread which shares data with another thread on the same processor of that other thread so that, when the blocked thread awakens and runs, that thread is closer to the shared data.

17 Claims, 5 Drawing Sheets

TECHNIQUES FOR PROVIDING IMPROVED AFFINITY SCHEDULING IN A MULTIPROCESSOR COMPUTER SYSTEM

CROSS-REFERENCE TO RELATED APPLICATIONS

This application is a continuation of U.S. application Ser. No. 11/084,951 filed Mar. 21, 2005, the disclosure of which is incorporated in its entirety by reference herein.

BACKGROUND

Conventional time-limited affinity scheduling within a multiprocessor computer system typically involves the scheduling subsystem of the computer system unparking and preferentially dispatching a thread onto the processor on which the thread last ran if less than a predetermined time period has elapsed since the thread last ran (i.e., the thread is still "warm"). This affinity-aware manner of scheduling during the predetermined time period enables the computer system to enjoy more-efficient operation since it is likely that a warm thread retains some residual affinity for the processor on which that thread recently ran. Specifically, using time-limited affinity-aware scheduling, the odds are much improved that the code cache, data cache and translation lookaside buffer (i.e., a cache of virtual to physical memory translations), still contain information used by the thread when it last ran on that processor. Furthermore, it is likely that the thread will access much of that same data after it resumes execution.

It should be understood that time-limited affinity-aware scheduling reduces the so-called "cache reload transient" penalty. In particular, when a "cold" thread is initially dispatched onto a processor, the cold thread will start to access its own code, data and translations displacing previous information in the caches and populating the caches and translation lookaside buffers (TLBs) with its own thread-specific information. During this period (the cache reload transient), the thread incurs a significant number of cache misses and translation misses, significantly slowing its execution. If the caches use a write-back policy instead of a write-through policy, when the cold thread misses, it will have to wait again while its data is loaded from memory into the cache. That is, when the cold thread misses, cached data which is likely associated with another thread will be evicted from the cache. Next, new data for the cold thread must be brought into the cache. Accordingly, there are two penalties, namely, the write-back of the cached data and then the subsequent loading of the new data into the cache. This situation would also occur if the thread is unparked after a substantial amount of time has passed (e.g., if the thread becomes cold again due to the expiration of the predetermined time period).

Before presenting an example of time-limited affinity scheduling, a brief discussion of the taxonomy of cache misses will be provided. As a thread executes on a processor, the following can be found in the processor's cache:

A. Shared read-only executable code (i.e., it is typical for threads to share code but access distinct data).
B. Shared read-only data (e.g., a table that never changes).
C. Shared read-write data (e.g., data protected by a lock or mutex mechanism of some kind in order to coordinate access to the data and avoid interference between threads).
D. Private thread-specific read-write data (e.g., a thread's own stack).
E. Residual data and code installed in the cache by the execution of some prior thread, but that has not yet been displaced by the current thread.

By convention, no locks or mutex mechanisms are needed to access (A), (B) and (D).

Furthermore, on a multiprocessor system, copies of shared read-only elements may reside in the caches of multiple processors at the same time. For read-write data, however, in order to provide coherency and a consistent view of memory, only one processor typically can have a "dirty" or modified copy in its caches at a given time. If some other processor needs to modify or read that dirty cache line, the processor with the dirty copy must pass the cache line to the requesting processor by way of the coherency interconnect.

There are two types of caches misses. A cache miss against read-only lines, such as executable code, will be satisfied from memory. A miss against a dirty cache line incurs more latency on most architectures as the system needs to "steal" or migrate the cache line from the processor that owns the cache line (i.e., the processor that has the cache line in modified/dirty state). Both types of misses incur latency (which impacts the missing CPU) and consume memory and coherency interconnect bandwidth which can impact the throughput of the system as a whole, as the coherency and memory channels have fixed bandwidth. That bandwidth usually is a fixed resource, and efforts to conserve bandwidth yield improve scalability.

The following is an example of conventional time-limited affinity scheduling in a JAVA®-equipped multiprocessor system. Suppose that the system has threads which share access to a critical section of memory (commonly referred to as a "synchronized block") using a user-mode mutual exclusion technique. In particular, suppose that a first thread and a second thread coordinate access to the critical section using JAVA monitors provided by a JAVA Virtual Machine. Along these lines, suppose that the first thread is currently running on a first processor and that the second thread is currently blocked after running on a second processor. Furthermore, suppose that the first thread currently owns a lock on the critical section and is in the process of writing data to the critical section, i.e., the first thread owns a monitor and the second thread resides on the entry list of that monitor.

When the first thread finishes its work, the first thread relinquishes the lock on 10 the critical section and wakes the second thread. That is, the first thread exits the monitor and calls a JAVA routine to unpark the second thread (e.g., "unpark0"). It should be understood that threads "park" themselves and that, once parked, a thread is ineligible to run until it is subsequently unparked by some other thread. Parked threads do not appear on the dispatch queue ("ready queue") so the system scheduler will never 15 dispatch a parked thread. Unparking a thread makes the thread runnable and places the thread on a ready queue.

In response to the JAVA procedure call, the scheduling subsystem places the second thread on the ready queue of one of the processors, and eventually picks the second thread from that ready queue for running When the second thread begins execution, the second thread can attempt to obtain ownership of the monitor in order to access the critical section.

When the scheduling subsystem places the second thread onto the ready queue of one of the processors, the scheduling subsystem looks at state information of the second thread to (i) determine how much time has elapsed since the second thread last ran, and (ii) identify the processor that last ran the second thread. If less than the predetermined time period has elapsed (i.e., if the second thread is still warm), the scheduling subsystem performs affinity-aware scheduling by moving the second thread onto the ready queue of the processor that last ran the second thread, i.e., the second processor. Accordingly, some of the cached executable thread code for the second thread may still reside in the cache thus alleviating the need to re-cache that executable thread code.

However, if more than the predetermined time period has elapsed (i.e., if the second thread is now cold), the scheduling subsystem disregards affinity (i.e., the system operates in an affinity-unaware manner) by moving the second thread onto the ready queue of the least-utilized processor which may or may not be the second processor. Here, it is unlikely that any executable thread code for the second thread remains cached. Accordingly, the multiprocessor system places a higher value on operating in a load balanced manner vis-il-vis an affinity-aware manner, and thus schedules the second thread on the processor which is least busy.

SUMMARY

Improved techniques utilize state information of a blocked thread to provide "pull" affinity for a particular processor of a computerized system after a predetermined amount of time has elapsed since the blocked thread ran on the computerized system (i.e., after the blocked thread has become cold). For example, suppose that a running thread (i) shares data with a blocked thread within a cache and (ii) sets state information of the blocked thread to identify affinity for the same processor of the running thread. If the running thread relinquishes access to the shared data, and if the blocked thread awakens and runs on the same processor (i.e., the newly awakened thread is "pulled" toward the processor of the running thread), the newly awakened thread will be able to access the shared data from the same cache without requiring the system to perform burdensome cache coherency tasks.

Critically, for a JAVA® monitor (lock) or a mutex, if a thread T1 releases a lock L that protects data X, and a thread T2 is competing for L, then (by the nature of locking) thread T2 will likely access X. It is this property (or observation) that is leveraged in pull-affinity. As such, pull affinity benefits all of (A), (B), (C) and (D). That is, pull-affinity improves the cache miss rate for read-only lines, read-write lines and translation buffers.

One embodiment is directed to a method of controlling a thread on a computerized system having multiple processors. The method involves accessing state information of a blocked thread, and maintaining the state information of the blocked thread at current values when the state information indicates that less than a predetermined amount of time has elapsed since the blocked thread ran on the computerized system. The method further involves setting the state information of the blocked thread to identify affinity for a particular processor of the multiple processors when the state information indicates that at least the predetermined amount of time has elapsed since the blocked thread ran on the computerized system. Such operation enables the system to place a cold blocked thread which shares data with another thread on the same processor of that other thread so that, when the blocked thread awakens and runs, that thread is closer to the shared data.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

The drawings are not necessarily to scale, emphasis instead being placed upon illustrating the principles of the invention.

DETAILED DESCRIPTION

Improved techniques utilize state information of a blocked thread to provide "pull" affinity for a particular processor of a computerized system after a predetermined amount of time has elapsed since the blocked thread ran on the computerized system. For example, if another thread (i) shares data with the blocked thread within a cache and (ii) sets state information of the blocked thread to identify affinity for a processor having convenient access to the same cache, the blocked thread will likely run on that processor and thus enjoy certain optimizations when it awakens and accesses the shared data from the same cache. In particular, such "pulling" of the blocked thread toward that processor increases the opportunity to reduce cache coherency traffic (i.e., there would be no need to copy the shared data from one cache to another which would otherwise consume processor cycles and interconnect bandwidth), thus enhancing operation of the system as a whole even though the predetermined amount of time has elapsed making it unlikely that there is any executable thread code remaining cached within the system when the blocked thread awakens.

Figure 1:
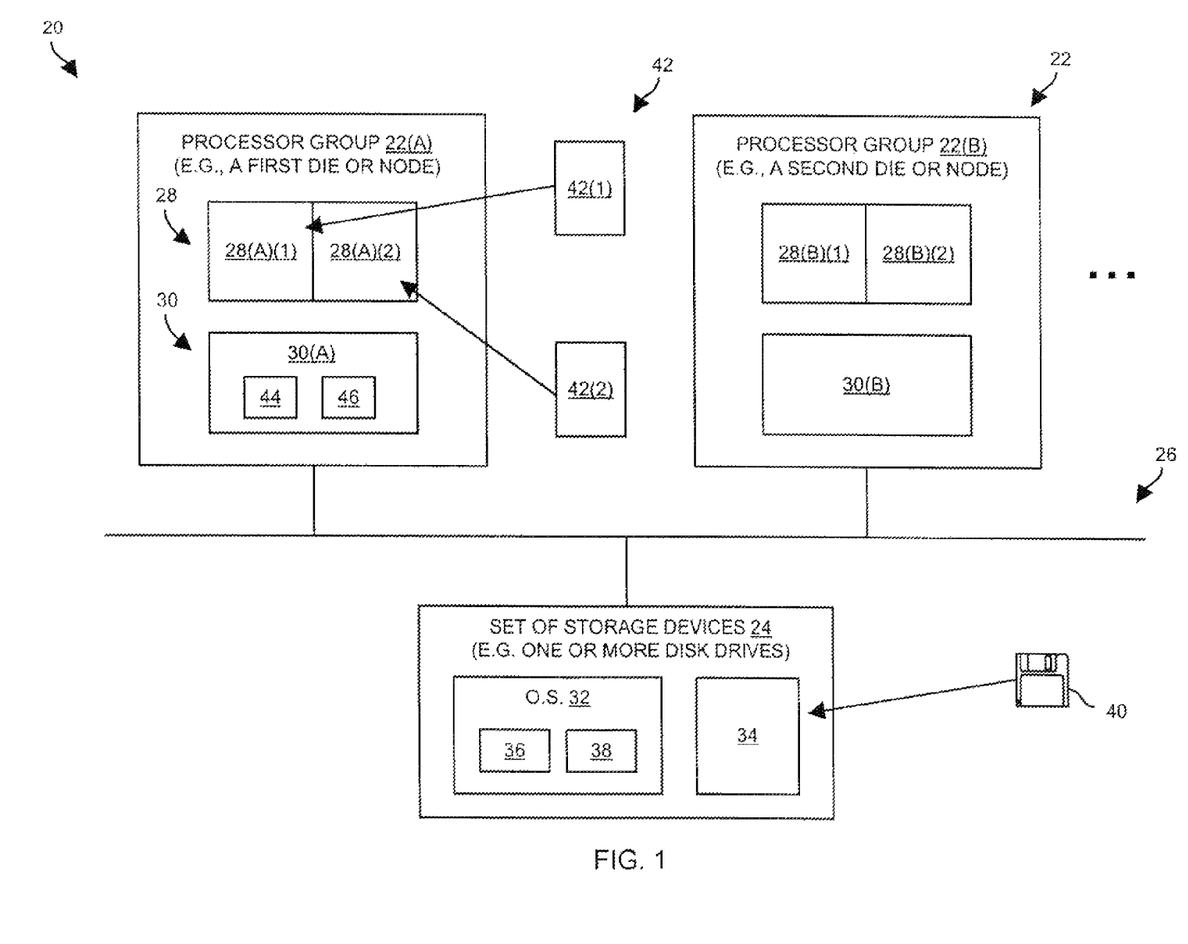
FIG. 1 is a block diagram of a computerized system which is suitable for use by the improved techniques.

FIG. 1 shows a computerized system 20 which is well-suited for running pull affinity scheduling techniques. The computerized system 20 includes multiple processor groups 22(A), 22(B), . . . (collectively, processor groups 22), a set of storage devices 24 (e.g., one or more disk drives), and an interconnection mechanism 26. Although the interconnection mechanism is shown as a multi-drop bus, a variety of alternative interconnection topologies are suitable for providing data transfer between the processor groups 22 and the storage devices 24 (e.g., one or more buses, a network of point-to-point connections, one or more loops, combinations thereof, etc.).

Each processor group 22 includes multiple processors 28 and local memory 30. For example, the processor group 22(A) includes processors 28(A)(i), 28(A)(2) and local memory 30(A). Similarly, the processor group 22(B) includes processors 28(B)(1), 28(B)(2) and local memory 30(B), and so on.

The processors 28 are configured to run a multiprocessing operating system 32 and higher level code 34 (e.g., one or more user-mode applications written in JAVA, C, C++, shell scripts, command files, combinations thereof, etc.) which are stored in a non-volatile manner within the set of storage devices 24. The operating system 32 includes an improved scheduler 36 and other operating system constructs 38 (e.g., predetermined operating system settings, operating system utilities, plug-ins, code to provide a JAVA Virtual Machine, etc.). One or more computer program products 40 deliver the operating system 32 and the code 34 to the set of storage devices 24 from an external source. Although the computer program product 40 is illustrated as a diskette by way of example only, a variety of communications and storage media are suitable for use (e.g., a set of CD-ROMs, tapes, memory cards or sticks, network downloads, propagated signals, combinations thereof, etc.).

Once the operating system 32 and the code 34 are properly installed within the computerized system 20, the computerized system 20 generates an operating environment or platform (e.g., Solaris, Linux, Windows/NT, etc.) by running the operating system 32. The operating system 32 then runs the code 34 within this environment. In particular, the multiprocessor configuration of the computerized system 20 enables the system 20 to concurrently run multiple streams of execution (e.g., processes, threads, etc.) which are hereinafter generally referred to as threads 42.

Preferably, the scheduler 36 operates using (i) conventional time-limited affinity 25 scheduling for threads 42 which are still warm, and (ii) pull affinity for threads 42 which have become cold. A short summary of conventional time-limited affinity in the context of the computerized system 20 will be discussed before proceeding to a more-detailed discussion of pull affinity.

Suppose that two threads 42(1), 42(2) are configured to share data within a portion 44 of the local memory 30(A). Further suppose that the thread 42(2) has recently transitioned from a running state to a blocked (or parked) state after running on the processor 28(A)(2). In particular, suppose that the thread 42(2) has just finished writing data to the shared memory portion 44, and has just relinquished ownership of a lock on the shared memory portion 44. At this point, the operating system 32 has updated state information corresponding to the thread 42(2) to identify, among other things, the processor 28 on which the thread 42(2) last ran and a time stamp of when the thread 42(2) last ran (i.e., the processor 28(A)(2)). Currently, code 46 (i.e., cache lines) for the thread 42(2) remains cached in the local memory 30(A).

While the thread 42(2) remains blocked, suppose that the thread 42(1) performs some useful work and then unparks the thread 42(2). In particular, suppose that the thread 42(1) acquires ownership of the lock on the shared memory portion 44, accesses the data therein, relinquishes ownership of the lock, and directs the scheduler 36 to wake the blocked thread 42(2) before parking itself In response, the scheduler 36 moves the thread 42(2) onto the ready queue of one of the processors 28 for subsequent dispatch and execution.

When the scheduler 36 moves the thread 42(2) onto the ready queue of one of the processors 28, the scheduler 36 looks at the state information of the thread 42(2). In particular, the scheduler 36 determines whether the thread 42(2) is still warm by comparing the time stamp of when the thread 42(2) last ran to a current time stamp to determine whether a predetermined amount of time has elapsed (e.g., two minutes, 30 seconds, a predefined number of clock cycles, etc.). This predetermined amount of time (i.e., a predefined threshold) is preferably a preset tuning parameter which can be changed by a system administrator (e.g., see the operating system constructs 38 in FIG. 1).

If less than the predetermined amount of time has elapsed since the thread 42(2) last ran, the thread 42(2) is considered warm because it is likely that at least some of the thread code 46 remains resident in the local memory 30(A) to make it worth while to dispatch the thread 42(2) on the same processor 28 on which it last ran. It should be understood that the term "thread code" in this context is intended to generally include executable code of the thread but also corresponding data and translations. Accordingly, the scheduler 36 identifies the processor 28 on which the thread 42(2) last ran from the state information and moves the thread 42(2) onto the ready queue of that same processor 28 (i.e., the processor 28(A)(2)). This procedure is commonly referred to as time-limited affinity scheduling which results in significant operation savings since such scheduling increases the odds that a new copy of the thread code 46 will not need to be re-cached from the set of storage devices 24 (see the code 34 in FIG. 1). Furthermore, avoidance of re-caching the thread code 46 alleviates the need to consume other resources within the computerized system 20 as well (e.g., updating of the translation lookaside buffer (TLB), contention for use of the interconnection mechanism 26, contention for memory bandwidth, etc.).

It should be understood that conventional computer systems typically would operate in an affinity-unaware manner once the predetermined time period has elapsed by ignoring affinity information for a cold thread when queuing that thread for execution. That is, since the thread is now cold and it is unlikely that the thread code remains cached at that point and the conventional system would next look to load balancing the operating of the system.

However, in contrast to these conventional computer systems and as will be explained in further detail below, the computerized system 20 is configured to provide pull affinity after the predetermined amount of time has passed. Here, the scheduler 36 is capable of moving a cold thread 42 onto the ready queue of a processor 28 running another thread 42 which shares data with the cold thread 42. In particular, state information of the thread 42(2) is set to increase the odds that the scheduler 36 will move the thread 42(2) onto the ready queue of the processor 28(A)(1) (i.e., the processor 28 for the thread 42(1)) rather than another processor 28 (e.g., rather than any of the processors 28 of the processor group 22(B). Accordingly, the cold thread 42 will have convenient access to the local memory 30 containing the shared data 44 when it awakens thus alleviating the need for extensive operations to move the shared data between caches (i.e., no cache coherency operations are required to move the data 44 to the local memory 30(B)). As a result, pull affinity improves cycle per instruction (CPI) performance of the computerized system 20 and is extremely well-suited for heavily synchronized multi-threaded applications running on symmetric multi-processing (SMP) systems.

Pull affinity improves the performance of individual threads that partake in the pull affinity protocol, but it also improves the scalability and throughput of the system as a whole. On a multiprocessor system, other unrelated threads that happen to run in parallel with threads using pull affinity will benefit as the threads using pull affinity consume of the contended and shared resources such as memory bandwidth and coherency interconnect bandwidth. The pull affinity capabilities of the computerized system 20 will now be further explained in connection with FIGS. 1 and 2.

Figure 2:
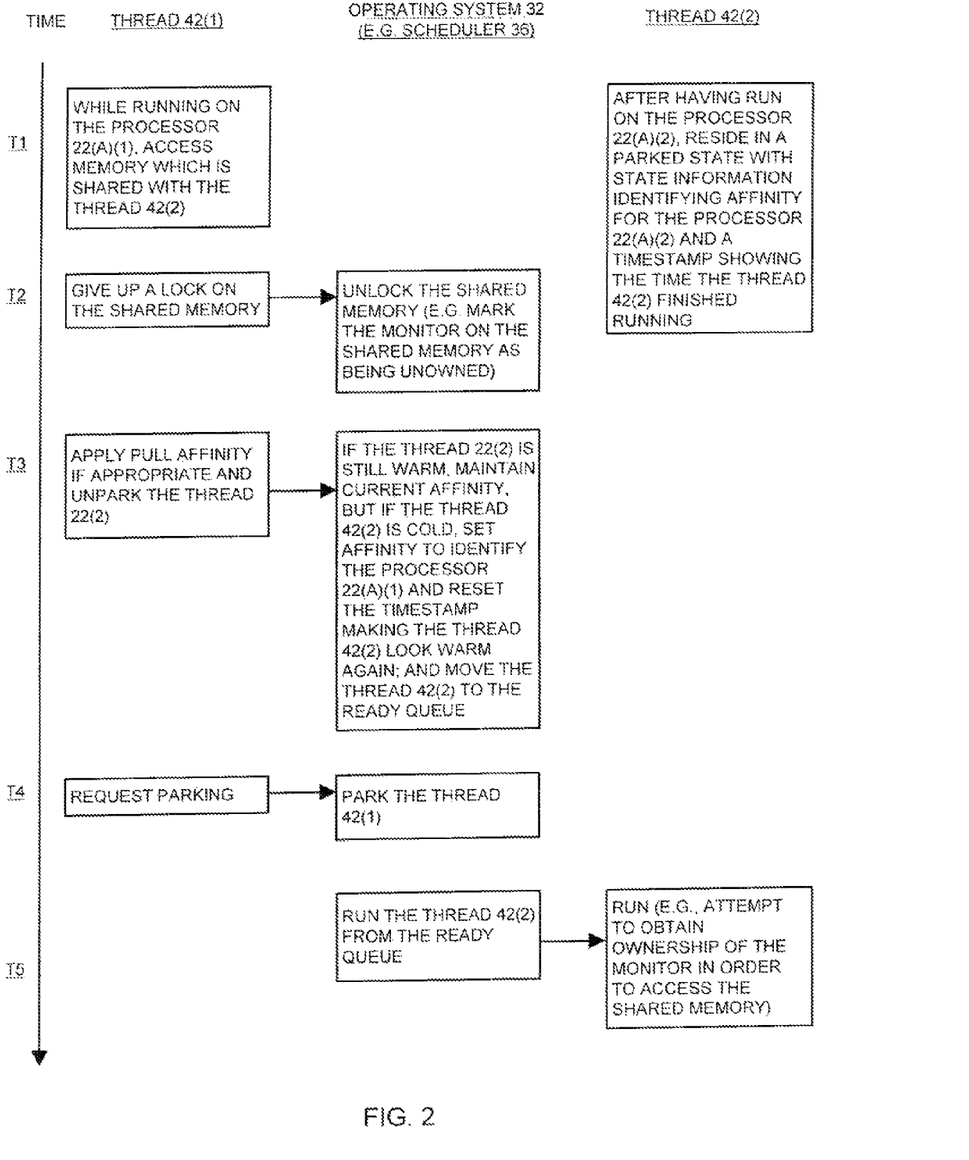
FIG. 2 is a block diagram illustrating interaction between two threads configured to share data within the computerized system of FIG. 1.

FIG. 2 shows a sequence of operations which is supported by the computerized system 20 of FIG. 1. The first column shows activity by the thread 42(1), the second column shows activity by the operating system 32 (e.g., the scheduler 36), and the third cohmm shows activity by the thread 42(2) which shares data through the portion 44 of the local memory 30(A) (also see FIG. 1). Time elapses in the downward direction. For illustration purposes only, the sequence is in the context of a JAVA Virtual Machine.

At time T1, the thread 42(1) is running on the processor 28(A)(1) and the thread 42(2) has recently transitioned to a blocked state. While the thread 42(1) runs on the processor 28(A)(1), the thread 42(1) accesses the portion 44 of the local memory 30(A) which is shared between the threads 42(1), 42(2) (also see FIG. 1).

At time T2, the thread 42(1) has finished accessing the shared memory portion 44 and now gives up a lock on the portion 44. In particular, the thread 42(1) relinquishes a JAVA monitor associated with the portion 44, and the monitor is marked as unowned.

At time T3, the thread 42(1) unparks the thread 42(2) and applies pull affinity to the thread 42(2) if appropriate. In some arrangements, this operation is embodied as a call to an improved operating system call (e.g., a single routine called "unparkPull0"). In response, the operating system 32 checks the state information of the thread 42(2) to determine whether the thread 42(2) is still warm. In particular, operating system 32 compares the time stamp in the state information with the current time to determine whether the predetermined amount of time has elapsed since the thread 42(2) last ran.

If the operating system 32 determines that less than the predetermined amount of time has elapsed since the thread 42(2) last ran, the operating system 32 concludes that that the thread 42(2) is still warm so that (i) conventional time-limited scheduling affinity is appropriate and (ii) pull affinity is inappropriate. Accordingly, the operating system 32 maintains the current affinity settings within the state information of the thread 42(2), and simply moves the thread 42(2) onto a ready queue based on the current affinity settings. Such operation increases the odds that the thread 42(2) will execute on the same processor 28 (i.e., the processor 28(A)(2)) on which the thread 42(2) last ran in order to avoid re-fetching cache lines (i.e., the code 46) for the thread 42(2).

However, if the operating system 32 determines that the predetermined amount of time has elapsed since the thread 42(2) last ran, the operating system 32 concludes that the thread 42(2) has become cold so that (i) conventional time-limited scheduling affinity is inappropriate (i.e., it is unlikely that the code 46 for the thread 42(2) is still cached) and (ii) pull affinity is now appropriate. That is, the operating system 32 changes the affinity settings within the state information of the thread 42(2) to provide pull affinity for the processor even though the thread code 46 for the thread 42(2) may no longer reside in the local memory 30(A). To provide pull affinity, the operating system 32 sets the state information to have affinity for the processor 28 which runs the thread 42(1) (i.e., the processor 28(A)(1)), and resets the time stamp to the current time to make the thread 42(2) appear warm again. As a result, if the thread 42(2) awakens shortly thereafter, the scheduler 36 can move the thread 42(2) onto the ready queue of the processor 28 on which the thread 42(1) last ran in order to improve the chance of the awakened thread 42(2) having easy access to the data shared between the threads 42(1), 42(2). This situation is preferable to running the thread 42(2) on a processor 28 of the processor group 22(B) which would require movement of the shared data in the local memory 30(B). That is, if the awakened thread 42(2) runs on the processor 28(A)(1), there is no need to move the shared data 44 between caches thus saving the computerized system 20 from performing unnecessary cache coherency operations, and from tying up the interconnection mechanism 26 unnecessarily.

At time T4, the thread 42(1) parks itself. The operating system 32 responds by transitioning the thread 42(1) to a blocked state.

At time T5, the operating system 32 dispatches the thread 42(2), and the thread 42(2) executes. If the thread 42(2) executes on the processor 28(A)(2) with time-limited affinity (i.e., the original predetermined amount of time has not yet elapsed), the code 46 for the thread 42(2) remains within the local memory 30(A) thus alleviating the need to re-fetch that code from the set of storage devices 24. Furthermore, if the thread 42(2) executes on the processor 28(A)(1) due to pull affinity (i.e., the blocked thread 42(2) became cold but then the operating system 32 applied pull affinity), the shared memory portion 44 is available to the thread 42(2) thus alleviating the need to perform extensive cache coherency operations. However, if the thread 42(2) executes on a processor 28 without affinity (i.e., the thread 42(2) was placed on a processor 28 in a load balancing manner and neither the thread code 46 nor the shared data 44 remains cached), there is no significant penalty to the thread 42(2) and the outcome is, in general, neutral (i.e., the system 20 must re-fetch both the thread code 46 and the shared data 44 in a conventional manner).

In summary, once the thread 42(2) runs on a processor 28, the thread 42(2) is free to attempt to obtain the ownership of the lock on the shared memory portion 44 (e.g., a JAVA monitor). If the thread 42(2) is successful, the thread 42(2) can then access the shared data.

Additionally, it should be understood that time-limited affinity attempts to run an awakened thread 42 on the same processor 28 on which the thread 42 last ran. This operation improves the opportunity for an awakened thread 42 to utilize cached thread code 46 (i.e., the cache thread code 46 may not yet have been overwritten by other code) thus alleviating the need to re-cache that code 46.

If too much time has passed for time-limited affinity to be useful and the thread 42 is now cold, pull affinity attempts to run the thread 42 on the same processor 28 which ran another thread 42 which awakened the thread 42. In the example above, the pull affinity increases the odds that the thread 42(2) runs on the processor 28(A)(1) which is not the processor 28(A)(2) on which the thread 42(2) last ran. Nevertheless, this operation provides potential performance improvement by increasing the opportunity for the awakened thread 42(2) to utilize cached shared data (i.e., the shared memory portion 44) may not yet have been overwritten by other code) thus alleviating the need to move the shared data between caches. Further details of pull affinity will now be provided with reference to FIG. 3.

Figure 3:
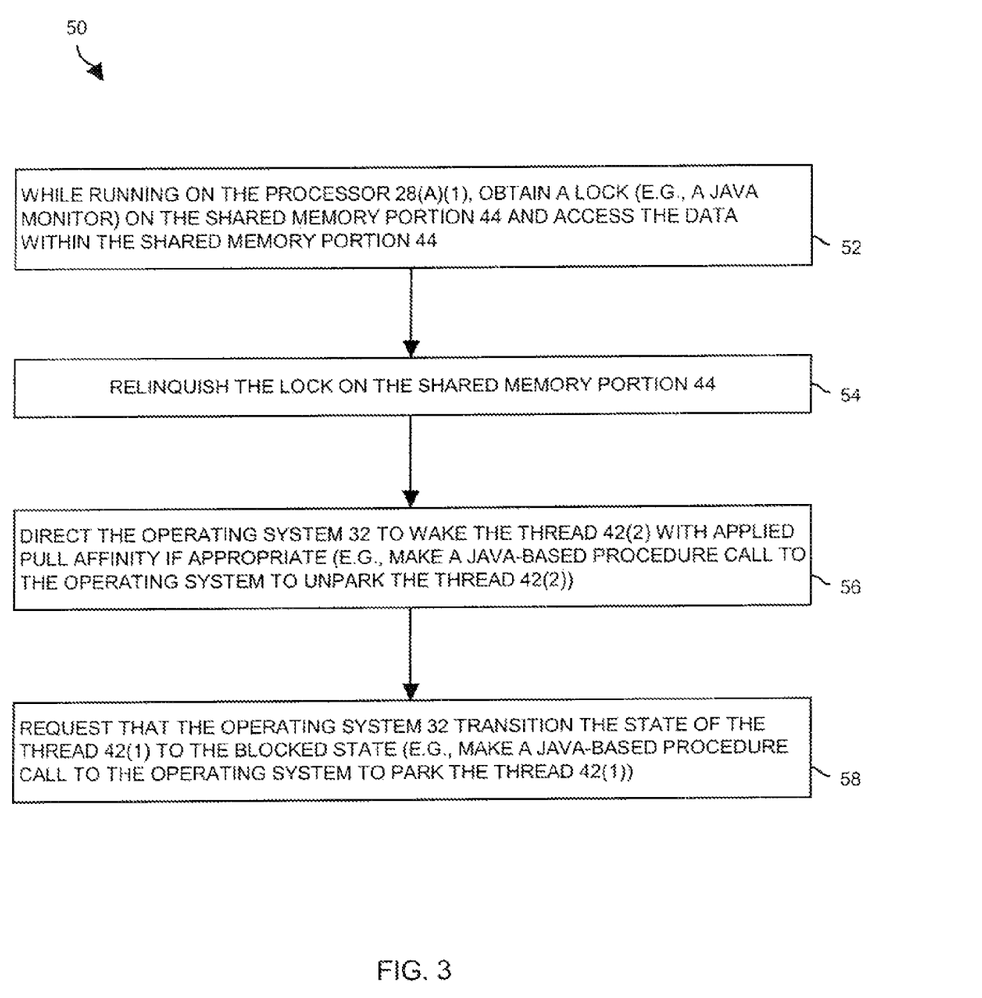
FIG. 3 is a flowchart of a procedure which is performed by one of the two threads of FIG. 2.

FIG. 3 is a flowchart of a procedure 50 which is performed by the thread 42(1). In step 52, the thread 42(1) runs on the processor 28(A)(1) and accesses the shared memory portion 44 while owning a lock on the portion 44 (e.g., a monitor).

In step 54, the thread 42(1) gives up the lock on the portion 44. At this point, the thread 42(1) is through accessing the portion 44 and is ready to block itself.

In step 56, the thread 42(1) wakes the thread 42(2) in order to allow the thread 42(2) to perform useful work by calling an improved routine which unparks the thread 25 42(2) and applies pull affinity onto the thread 42(2) if appropriate. In some arrangements, the improved routine is a single JAVA procedure call (e.g., unparkPull0). Alternatively, the improved routine is executable code belonging to the thread 42(1) itself.

In step 58, the thread 42(1) blocks itself. At this point, the thread 42(1) transitions into a blocked state and can be unparked upon some event. For example, the thread 42(2) can give the thread 42(1) pull affinity if the thread 42(1) becomes cold, and then awaken the thread 42(1) in a similar manner.

It should be understood that the procedure 50 utilizes an improved JAVA platform by effectuating pull affinity on another thread 42(2) using a simple JAVA procedure call. Accordingly, pull affinity is well-suited for high level applications which run multiple threads of execution. As a result, the above-described pull affinity techniques are capable of running in virtually any situation using user-mode synchronization services (e.g., POSIX 1003.1 c, "pthreads" condvars and mutexes, etc.). Further details of the invention will now be provided with reference to FIG. 4.

Figure 4:
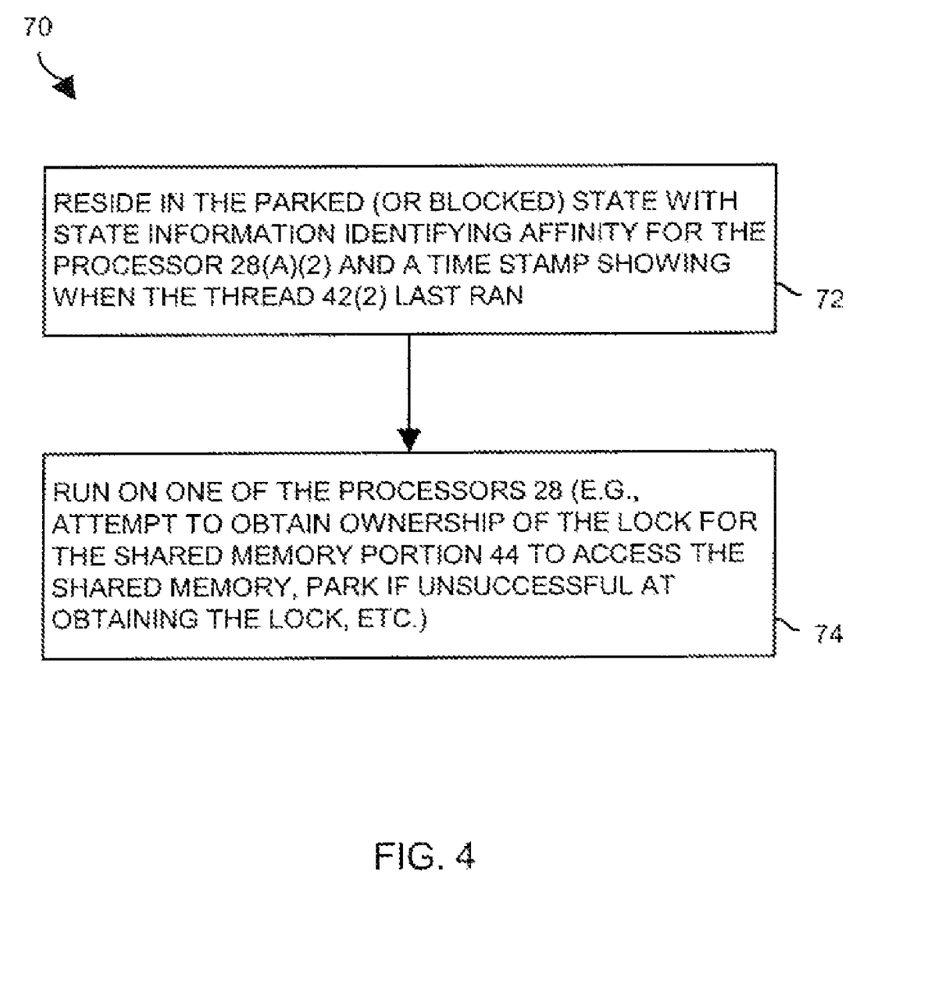
FIG. 4 is a flowchart of a procedure which is performed by the other of the two threads of FIG. 2.

FIG. 4 is a flowchart of a procedure 70 which is performed by the thread 42(2). In step 72, the thread 42(2) initially resides in a parked or blocked state with state information identifying affinity for the processor 28 on which the thread 42(2) last ran, i.e., the processor 28(A)(2). The state information further identifies a time stamp showing when the thread 42(2) last ran. The operating system 32 maintains this state information on behalf of the thread 42(2).

In step 74, the thread 42(2) awakens by running on one of the processors 28. If the thread 42(2) awakened with pull affinity due to the thread 42(1), the thread 42(2) will enjoy convenient access to the shared memory portion 44 which remains resident in the local memory 30(A) without imposing a cache coherency burden on the system 20. The thread 42(2) is then capable of attempting to acquire ownership of the lock on the shared memory portion 44 (e.g., a monitor). If the thread 42(2) is unsuccessful in obtaining the lock, the thread 42(2) can park itself (e.g., the thread 42(2) can move onto an entry list of the monitor). However, if the thread 42(2) successfully acquires ownership of the lock, the thread 42(2) can then access the shared data. Furthermore, the thread 42(2) is capable of subsequently relinquishing the lock, and awakening the thread 42(1) with applied pull affinity if appropriate in a manner similar to that shown in the procedure 50 of FIG. 3. Further details will now be provided with reference to FIG. 5.

Figure 5:
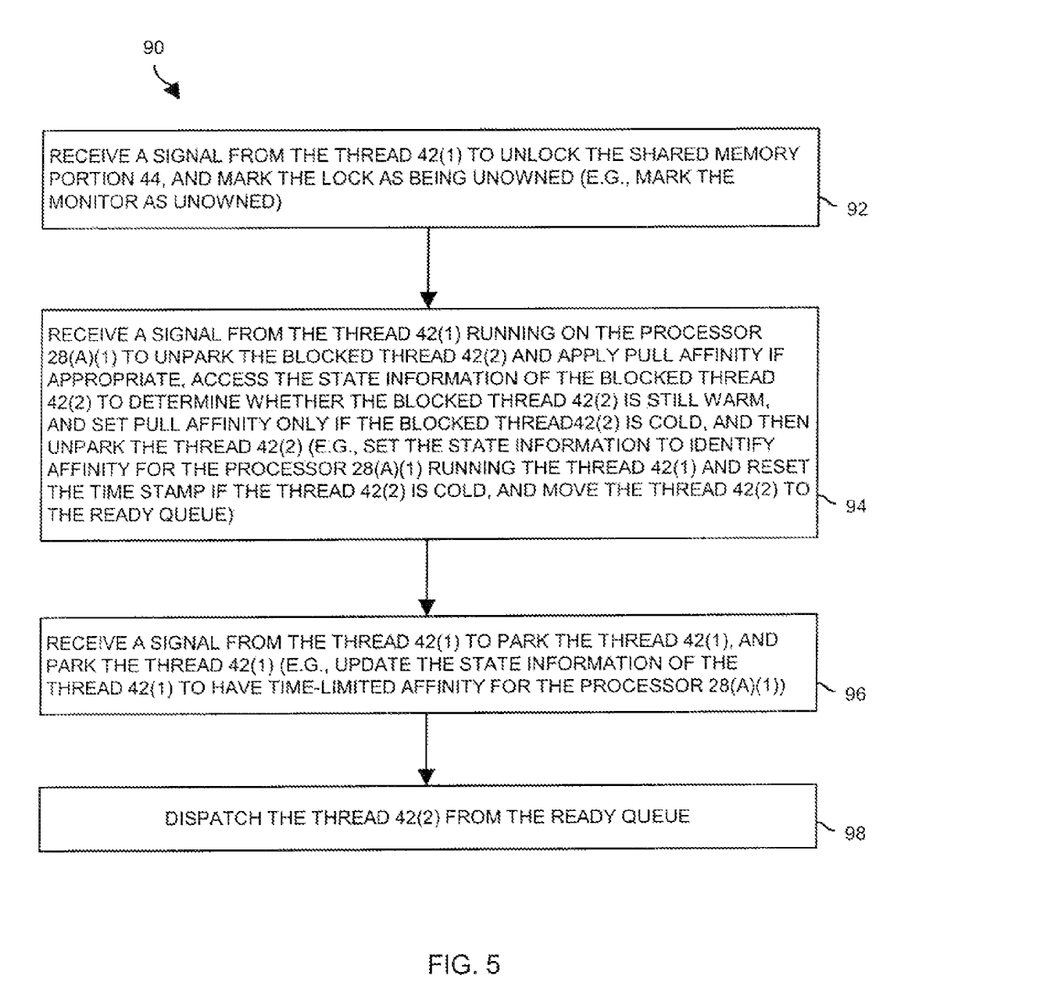
FIG. 5 is a flowchart of a procedure which is performed by a scheduler of an operating system when supporting scheduling of the two threads of FIG. 2.

FIG. 5 is a flowchart of a procedure 90 which is performed by the operating system 32 (e.g., the scheduler 36) when supporting pull affinity scheduling of the two threads 42(1), 42(2). In step 92, the operating system 32 receives a signal from the thread 42(1) running on the processor 28(A)(1) to unlock the shared memory portion 44 (see step 54 in FIG. 3), and marks the monitor for the portion 44 as being unowned.

In step 94, the operating system 32 receives a signal from the thread 42(1) to unpark the blocked thread 42(2) and apply pull affinity if appropriate (see step 56 in FIG. 3). Accordingly, the operating system 32 accesses the state information of the blocked thread 42(2) and determines whether the blocked thread 42(2) is still warm by comparing the time stamp within the state information of the thread 42(2) with the current time. If the blocked thread 42(2) is still warm, the operating system 32 maintains the current affinity settings of the blocked thread 42(2) thus allowing the blocked thread 42(2) to enjoy conventional time-limited affinity for the processor 28(A)(2) on which the blocked thread 42(2) last ran. That is, the operating system 32 maintains the state information of the blocked thread 42(2) at current values since the state information indicates that less than the predetermined amount of time has elapsed since the blocked thread 42(2) ran.

However, if the operating system 32 determines that blocked thread 42(2) is cold, the operating system 32 sets the affinity settings of the thread 42(2) to identify the processor 28(A)(1) since the thread 42(1) which initially signaled the operating system 32 to awaken the thread 42(2) is running on the processor 28(A)(1). Additionally, the operating system 32 resets the time stamp to the current time so that the blocked thread 42(2) appears warm again. Accordingly, the state information of the blocked thread 42(2) again indicates that less than the predetermined amount of time has elapsed since the thread 42(2) ran on the computerized system 20.

To unpark the blocked thread 42(2), the operating system 32 moves the thread 42(2) onto the ready queue of the processor 28 based on the state information of the thread 42(2). Accordingly, the thread 42(2) is now ready for execution.

In step 96, the operating system 32 receives a signal from the thread 42(1) to park the thread 42(1) (see step 58 in FIG. 3). The operating system 32 responds by transitioning the thread 42(1) to a blocked state. Preferably, the operating system 32 stores the identity of the processor 28(A)(1) and the current time in the state information of the thread 42(1) to allow the thread 42(1) to enjoy affinity scheduling as well.

In step 98, the operating system 32 executes the thread 42(2) on one of the processors 28. It should be understood that other circumstances could arise which causes the thread 42(2) to be stolen from the ready queue on which it resides (e.g., a sophisticated dispatching algorithm which aggressively moves threads 42 among ready queues for other optimization reasons such as load balancing).

Based on the above, it should be understood that the operating system 32 will avoid dispatching the thread 42(2) onto the processor group 22(B) unless the predetermined amount of time has transpired since setting pull affinity for the thread 42(2). That is, if the operating system 32 dispatches the thread 42(2) onto a processor 28 of the processor group 22(B), it is because (i) so much time has elapsed that it is extremely unlikely that there is any remaining cached thread code 46 or remaining cached shared data 44, and (ii) the system 20 has determined that running the thread 42(2) provides some other benefit (e.g., load balancing to an infrequently utilized processor 28).

As mentioned above, improved techniques utilize state information of a blocked thread 42(2) to provide pull affinity for a particular processor 28 of a computerized system 20 after a predetermined amount of time has elapsed since the blocked thread 42 ran on the computerized system 20. For example, if another thread 42(1) both (i) shares data with the blocked thread 42(2) within a cache 30 and (ii) sets state information of the blocked thread 42(2) to identify affinity for a processor 28 having convenient access to the same cache 30, the odds are advantageously increased that the thread 42(2) will run on that processor 28 and thus enjoy certain optimizations when it awakens and accesses the shared data from that same cache 30. In particular, such "pulling" of the blocked thread 42(2) toward that processor 28 increases the opportunity to reduce undesirable coherency traffic that would otherwise be generated if the blocked thread 42(2) did not have access to the same cache lines shared by the thread 42(1). Moreover, it should be understood that the potential savings in system performance provided by pull affinity by reusing cache lines storing shared data is substantial, while the potential loss if the application of pull affinity is unsuccessful is minimal (e.g., the cost of a failure of the blocked thread 42(2) to run on the same processor 28(A)(1) as the unparking thread 42(1) is, in general, neutral compared to the performance of conventional systems).

While this invention has been particularly shown and described with references to preferred embodiments thereof, it will be understood by those skilled in the art that various changes in form and details may be made therein without departing from the spirit and scope of the invention as defined by the appended claims. For example, the computerized system 20 is capable of imposing a limit on the total number of blocked threads 42 having affinity for a particular processor 28 (e.g., see the operating system construction 38 in FIG. 1). In some arrangements, the limit is a tunable preset number (e.g., one, two, etc.) which is controlled by a systems administrator. Such a limit prevents threads 42 from clustering onto and overwhelming a single processor 28. Rather, when the limit is reached, other performance optimization schemes can take place such as load balancing among less utilized processors 28 (e.g., excess threads on long dispatch queues are stolen by less-busy processors 28).

Additionally, it should be understood that a variety of architectures are suitable for use by the computerized system 20. For example, in some multiprocessor-per-die-based arrangements, there are processing units which reside on the same die and share a common on-die cache. Such cases include chip multiprocessing (CMP), chip multithreading (CMT), hyperthreaded and multi-core systems among others (e.g., an eight-way Pentium® hyperthreaded system).

Furthermore, in some non-uniform memory access (NUMA) based arrangements, there are processing units which reside in a single node with an adjacent cache. Such cases include CC-NUMA and NUMA systems among others. Other configurations are suitable for use as well such as irregular configurations, distributed configurations, and the like.

Based on the above-provided description, it should be understood that, in practice if thread U unparks thread V, it is likely that threads U and V communicate through shared memory. If thread V is not recently-run, the system 20 biases the kernel's dispatch queue selection mechanism to preferentially place thread V on the dispatch queue of a processor that is "near" the processor on which thread U currently runs. In the case of a CC-NUMA or NUMA system, "near" means on the same node. In the case of a CMT, CMP, HyperThreaded, or multi-core system, "near" means on the same die, and sharing a common level 2 cache.

For example, suppose that a 4-way SMP system has multi-core processors #0 and #1 residing on one die and sharing a common on-die level 2 cache. Further suppose that the system has multi-core processors (or CPUs) #2 and #3 residing on yet another die and sharing a common on-die level 2 cache. If thread U running on CPU #0 unparks thread V, and thread V is not recently run, then using pull affinity, thread U might artificially mark thread V as having affinity for CPU #0. Thread U then unparks thread V.

This increases the odds that the scheduler (via the unpark operation) will place thread V on the dispatch queue of a processor, such as CPU #1, that shares the level 2 cache with thread V. That, in turn, means that the shared cache lines likely required by thread V will already be in the level 2 cache of CPU #1 where thread V resumes execution. In the absence of pull affinity, thread V might resume on CPU #2 or CPU#3. When thread V then accessed the cache lines shared with thread U, the accesses would generate undesirable coherency traffic.

Furthermore, it should be understood that the computerized system 20 allows for disabling pull affinity (e.g., user-mode code can simply use unpark0 rather than unparkPull0) to avoid certain situations in which pull affinity is either less effective or possibly detrimental. For example, in applications that wake gangs of worker threads 42, the performance of the computerized system 20 may be better if pull affinity is not used and the threads 42 are dispersed over all of the processors 28. As another example, for a thread 42 which performs a "notify all" operation (e.g., notifyA110), it may be more efficient to allow the system 20 to simply load balance the notified threads 42 rather than use pull affinity.

Additionally, it should be understood that the above-described pull affinity techniques were described as being implemented as a dedicated "improved" unparkPull0 operation by way of example only. In other arrangements, these pull affinity techniques are implement in other ways. For example, Solaris®, Linux and Windows, respectively, provide processor_bind( ) sched_setaffinity0 and SetThreadIdealProcessor0 to establish affinity between threads and processors. These facilities can be used to transiently establish affinity between a thread and a processor. Specifically, prior to waking a first thread, an unlocking second thread can set the first thread's affinity to the processor on which the unlocking second thread is running Immediately after the first thread wakes up, the first thread would cancel this affinity. Such modifications and enhancements are intended to belong to various configurations and arrangements of the computerized system 20.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a thread on a computerized system having multiple processors, the method comprising:
   accessing state information of a blocked thread;
   maintaining the state information of the blocked thread when the state information indicates that less than a predetermined amount of time has elapsed since the blocked thread ran on the computerized system; and
   setting the state information of the blocked thread to identify affinity for a particular processor of the multiple processors when the state information indicates that at least the predetermined amount of time has elapsed since the blocked thread ran on the computerized system, wherein the particular processor of the multiple processors is selected based on state information of another thread run on the particular processor, the another thread waking the blocked thread and having shared data with the blocked thread;
   wherein the multiple processors have processor identifiers which distinguish the multiple processors from each other;
   and wherein setting the state information of the blocked thread to identify affinity for the particular processor of the multiple processors includes, in response to running the another thread on the particular processor, reading a processor identifier of the particular processor from state information of the another thread and modifying the state information of the blocked thread to include the processor identifier to set the state information of the blocked thread to identify affinity for the particular processor.

2. The method of claim 1, further comprising:
   after setting the state information of the blocked thread to identify affinity for the particular processor of the multiple processors and after setting the state information of the blocked thread to indicate that less than the predetermined amount of time has elapsed, waking the blocked thread.

3. The method of claim 2, further comprising:
in response to waking of the blocked thread, setting the state information of the blocked thread to no longer identify affinity for the particular processor of the multiple processors.

4. The method of claim 2, further comprising:
limiting a total number of blocked threads having affinity for the particular processor of the multiple processors to a preset number.

5. The method of claim 1, further comprising:
while setting the state information of the blocked thread to identify affinity for the particular processor of the multiple processors, setting the state information of the blocked thread to indicate that less than the predetermined amount of time has elapsed since the blocked thread ran on the computerized system.

6. The method of claim 1, further comprising:
sharing data within shared memory between the blocked thread and the another thread.

7. The method of claim 6 wherein the blocked thread and the another thread are configured to coordinate access to the data within the shared memory using JAVA monitors; and wherein accessing, maintaining and setting are performed in response to a JAVA-based procedure call performed by the another thread.

8. The method of claim 1 wherein the computerized system has a multiprocessor-per-die-based configuration formed, at least in part, by (i) a first die which includes first processing units and a first resident cache and (ii) a second die which includes second processing units and a second resident cache; wherein the blocked thread ran most-recently on the first die using cache lines of the first resident cache; wherein the another thread runs on the second die using cache lines of the second resident cache; and wherein modifying the state information of the blocked thread to include the processor identifier includes:
    adjusting the state information of the blocked thread to specify, as the particular processor of the multiple processors, one of the second processing units of the second die.

9. The method of claim 1 wherein the computerized system has a NUMA-based configuration formed, at least in part, by (i) a first node which includes first processing units and a first adjacent cache and (ii) a second node which includes second processing units and a second adjacent cache; wherein the blocked thread ran most-recently on the first node using cache lines of the first adjacent cache; wherein the another thread runs on the second node using cache lines of the second adjacent cache; and wherein modifying the state information of the blocked thread to include the processor identifier includes:
    adjusting the state information of the blocked thread to specify, as the particular processor of the multiple processors, one of the second processing units of the second node.

10. A non-transitory computer readable medium having computer executable instructions stored thereon for controlling a thread on a computer system having multiple processors, the instructions being configured to cause the computer system to:
    access state information of a blocked thread;
    maintain the state information of the blocked thread when the state information indicates that less than a predetermined amount of time has elapsed since the blocked thread ran on the computerized system; and
    set the state information of the blocked thread to identify affinity for a particular processor of the multiple processors when the state information indicates that at least the predetermined amount of time has elapsed since the blocked thread ran on the computerized system, wherein the particular processor of the multiple processors is selected based on state information of another thread run on the particular processor, the another thread waking the blocked thread and having shared data with the blocked thread;
    wherein the multiple processors have processor identifiers which distinguish the multiple processors from each other;
    and wherein the instructions, when causing the computer system to set the state information of the blocked thread to identify affinity for the particular processor of the multiple processors, are configured to cause the computer system to, in response to running the another thread on the particular processor, read a processor identifier of the particular processor from state information of the another thread and modify the state information of the blocked thread to include the processor identifier to set the state information of the blocked thread to identify affinity for the particular processor.

11. The computer readable medium of claim 10 wherein the instructions are further configured to cause the computer system to:
    after setting the state information of the blocked thread to identify affinity for the particular processor of the multiple processors and after setting the state information of the blocked thread to indicate that less than the predetermined amount of time has elapsed, wake the blocked thread.

12. The computer readable medium of claim 11 wherein the instructions are further configured to cause the computer system to:
    in response to waking of the blocked thread, set the state information of the blocked thread to no longer identify affinity for the particular processor of the multiple processors.

13. The computer readable medium of claim 10 wherein the instructions are further configured to cause the computer system to:
    while setting the state information of the blocked thread to identify affinity for the particular processor of the multiple processors, set the state information of the blocked thread to indicate that less than the predetermined amount of time has elapsed since the blocked thread ran on the computerized system.

14. A computerized system, comprising:
    multiple processors configured to run threads, the multiple processors being configured to:
        access state information of a blocked thread;
        maintain the state information of the blocked thread when the state information indicates that less than a predetermined amount of time has elapsed since the blocked thread ran on the computerized system; and
        set the state information of the blocked thread to identify affinity for a particular processor of the multiple processors when the state information indicates that at least the predetermined amount of time has elapsed since the blocked thread ran on the computerized system, wherein the particular processor of the multiple processors is selected based on state information of another thread run on the particular processor, the another thread waking the blocked thread and having shared data with the blocked thread;

wherein the multiple processors have processor identifiers which distinguish the multiple processors from each other;

and wherein the multiple processors, when setting the state information of the blocked thread to identify affinity for the particular processor of the multiple processors, are configured to, in response to running the another thread on the particular processor, read a processor identifier of the particular processor from state information of the another thread and modify the state information of the blocked thread to include the processor identifier to set the state information of the blocked thread to identify affinity for the particular processor.

15. The computerized system of claim 14 wherein the multiple processors are further configured to:

after setting the state information of the blocked thread to identify affinity for the particular processor of the multiple processors and after setting the state information of the blocked thread to indicate that less than the predetermined amount of time has elapsed, wake the blocked thread.

16. The computerized system of claim 15 wherein the multiple processors are further configured to:

in response to waking of the blocked thread, set the state information of the blocked thread to no longer identify affinity for the particular processor of the multiple processors.

17. The computerized system of claim 14 wherein the multiple processors are further configured to:

while setting the state information of the blocked thread to identify affinity for the particular processor of the multiple processors, set the state information of the blocked thread to indicate that less than the predetermined amount of time has elapsed since the blocked thread ran on the computerized system.

* * * * *